United States Patent
Davis et al.

(10) Patent No.: US 11,947,490 B2
(45) Date of Patent: Apr. 2, 2024

(54) INDEX GENERATION AND USE WITH INDETERMINATE INGESTION PATTERNS

(71) Applicant: BMC Software, Inc., Houston, TX (US)

(72) Inventors: Joel Chandler Davis, Montgomery, TX (US); Eric Michael Anderson, Friendswood, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 17/446,600

(22) Filed: Aug. 31, 2021

(65) Prior Publication Data
US 2023/0062227 A1 Mar. 2, 2023

(51) Int. Cl.
G06F 16/00 (2019.01)
G06F 16/13 (2019.01)
G06F 16/14 (2019.01)
G06F 16/178 (2019.01)

(52) U.S. Cl.
CPC ............ G06F 16/13 (2019.01); G06F 16/148 (2019.01); G06F 16/1794 (2019.01)

(58) Field of Classification Search
CPC ..... G06F 16/13; G06F 16/148; G06F 16/1794
USPC ......................................................... 707/741
See application file for complete search history.

(56) References Cited

U.S. PATENT DOCUMENTS

| | | | | |
|---|---|---|---|---|
| 7,725,437 B2 * | 5/2010 | Kirshenbaum | ....... | G06F 16/137 707/650 |
| 9,514,184 B2 * | 12/2016 | Wulff | ..................... | G06F 16/245 707/707 |
| 10,216,862 B1 * | 2/2019 | Shrigondekar | ....... | G06F 16/901 |
| 11,030,254 B2 * | 6/2021 | Shrigondekar | ....... | G06F 16/904 |
| 11,263,211 B2 * | 3/2022 | Caudy | .................... | G06F 40/117 707/707 |
| 11,556,592 B1 * | 1/2023 | Shrigondekar | ....... | G06F 16/904 |
| 11,734,246 B2 * | 8/2023 | Andreev | ............. | G06F 16/2272 707/741 |
| 2009/0037456 A1 * | 2/2009 | Kirshenbaum | ....... | G06F 16/137 707/999.102 |
| 2014/0297650 A1 * | 10/2014 | Lim | ..................... | G06F 16/2272 707/741 |
| 2019/0147002 A1 * | 5/2019 | Shrigondekar | ... | G06F 16/90335 707/746 |
| 2019/0258625 A1 * | 8/2019 | Caudy | .................... | H04L 51/212 707/707 |
| 2020/0372004 A1 * | 11/2020 | Barber | .................. | G06F 16/213 707/707 |

* cited by examiner

*Primary Examiner* — Alexandria Y Bromell
(74) *Attorney, Agent, or Firm* — Brake Hughes Bellermann LLP

(57) ABSTRACT

Large numbers of files having widely varying structures and formats may be ingested, and used to generate dynamic slot indexes that enable fast and reliable searching of the files. Unique data patterns within the files are used to generate unique pattern models, which enable model-specific mappings of file fields to slots of a dynamic slot index. Accordingly, the dynamic slot indexes may reuse a single slot for multiple fields. Complex queries may then be processed in a time-efficient and resource-efficient manner, even when rapidly ingesting huge numbers of files having indeterminate data patterns from many different sources.

20 Claims, 8 Drawing Sheets

INDEX GENERATION AND USE WITH INDETERMINATE INGESTION PATTERNS

TECHNICAL FIELD

This description relates to index generation and use for searching files.

BACKGROUND

When a structure and format of data to be searched is known in advance, various techniques exist that may be used to facilitate desired searching of such data. For example, relational database or columnar database techniques may be used.

In many cases, however, it may be desirable to search data for which a structure and format of the data is not known in advance. For example, individual files (e.g., documents, messages, datasheets, or forms) included in such data may include many different structures, formats, or content. In such cases, searching large numbers of files may be a time-intensive and resource-intensive process and the result may be indeterminate.

For example, it is possible to analyze a file and generate one or more index(es) that may be used to search the file. When a number of files being indexed is large, however, or when files have widely varying structures, format, or content, the resulting indexes (and associated processes for generating and using the indexes) become impractical or impossible to use.

SUMMARY

According to one general aspect, a computer program product may be tangibly embodied on a non-transitory computer-readable storage medium. The computer program product may include instructions that, when executed by at least one computing device, may be configured to cause the at least one computing device to generate a first pattern model for a first file having a first field and a second field, the first pattern model including a first model identifier (ID), the first field, and the second field. The instructions, when executed by the at least one computing device, may be configured to cause the at least one computing device to update a slot index to map, for the first pattern model, the first field to a first slot of the slot index, and to map the second field to a second slot of the slot index. The instructions, when executed by the at least one computing device, may be configured to cause the at least one computing device to generate a second pattern model for a second file having a third field and the second field, the second pattern model including a second model ID and including the third field and the second field. The instructions, when executed by the at least one computing device, may be configured to cause the at least one computing device to update the slot index to map, for the second pattern model, the third field to the first slot of the slot index, and to map the second field to the second slot of the slot index.

According to other general aspects, a computer-implemented method may perform the instructions of the computer program product. According to other general aspects, a system, such as a mainframe system, may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Figure 1:
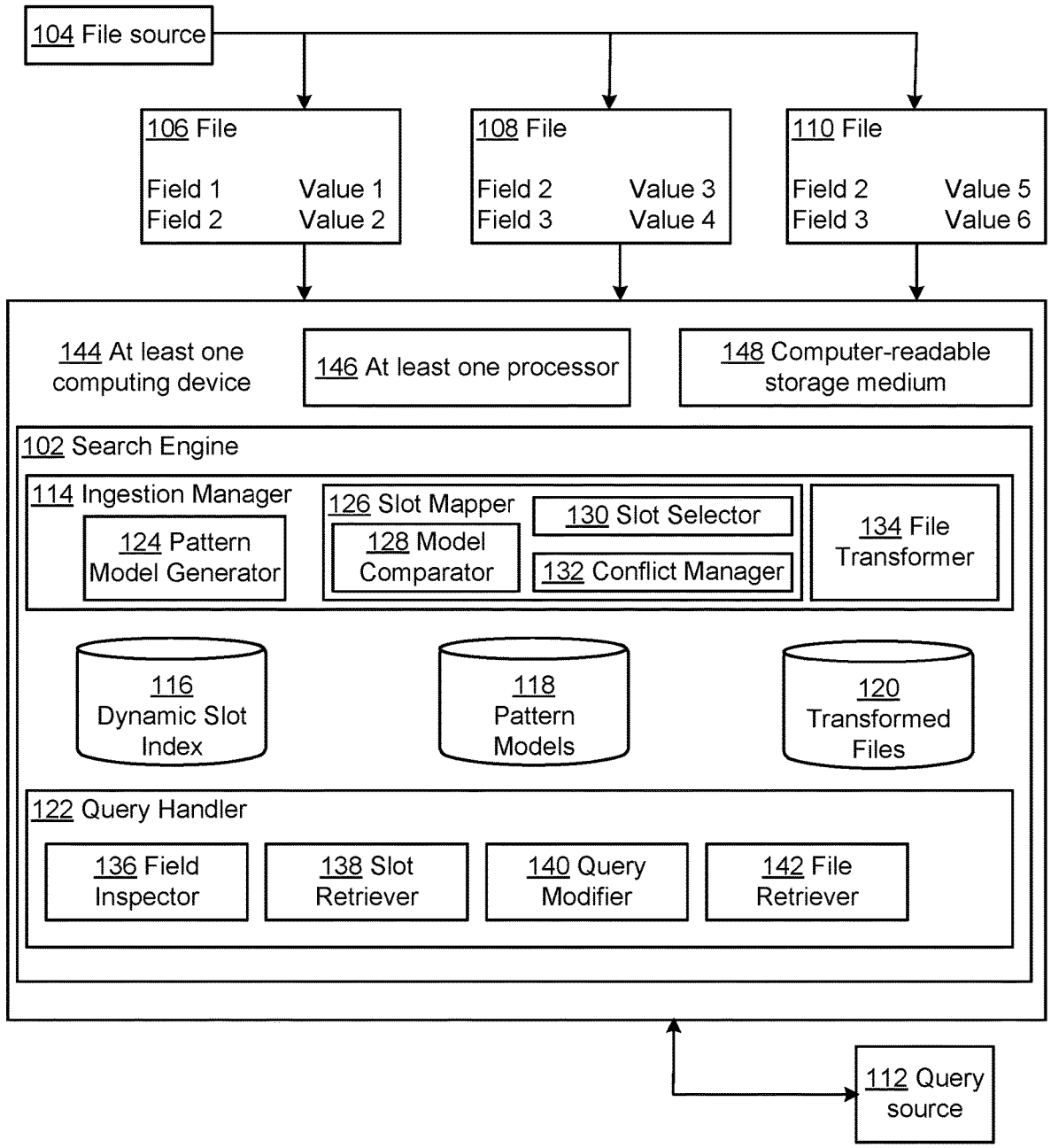
FIG. 1 is a block diagram of a system for index generation and use for indeterminate ingestion patterns.

Described systems and techniques enable the intake of large numbers of files having widely varying structures and formats, as well as generation of indexes that enable fast and reliable searching of the files. Accordingly, it is possible to receive complex queries and return desired query results in a time-efficient and resource-efficient manner, even when rapidly ingesting huge numbers of files having indeterminate data patterns from many different sources.

For example, many businesses and other entities generate data that reflects, or results from, ongoing operations, including business and/or Information Technology (IT) operations. For example, interactions with customers of a business may continuously occur, and related operations of an infrastructure of the business may occur, to enable or support the customer interactions.

In these and similar contexts, many different types of data logging may occur. As described in detail, below, data logging generally refers to the capture, collection, and storage of data over time, as associated events occur with respect to underlying hardware and software components. Data logging, and resulting data logs, enables or facilitates many advantageous capabilities with respect to the operation of the hardware and software components for which the data logging is performed.

For example, data logging enables identification, analysis, and correction of system malfunctions. In other examples, data logging may enable optimization of various system functions. In still other examples, data logging may enable forensic analysis in the wake of a ransomware attack, or other security breach, so as to identify infrastructure weaknesses that may have allowed such an attack to be successful.

For these and other reasons, it may be desirable to search or otherwise analyze log data. However, data logging may capture huge volumes of data, of varying types, from many different sources. Moreover, since the log data is continuously generated by ongoing operations of a technology landscape or other infrastructure, it may be necessary or desirable to continuously input new or current log data.

In addition to frequent updates of log data content, changes to a structure and format of the log data may also occur. For example, when a new component comes online (e.g., from a new tenant for which log data capture and analysis are provided), the new component may generate log data using a different format than existing components. In other examples, IT support staff may reconfigure a component, resulting in corresponding changes to log data captured for that component. In still other examples, log data may change over time based on a manner in which component(s) are used.

For these and other reasons, it may be impractical or impossible to use conventional (e.g., relational) database techniques as a primary technique for searching log data. Instead, described techniques use dynamic slot indexes and related techniques to generate indexes for searching log data, and many other types of data. Such dynamic slot indexes may be generated and used on an on-going basis as new data is received. Such dynamic slot indexes may be used even when details of a structure and format of such data are not known ahead of time, or change over time, or are otherwise indeterminate. Moreover, the dynamic slot index techniques provide these and other features in a fast and efficient manner, without overwhelming hardware and software resources used to perform the dynamic slot indexing.

Described techniques identify and leverage unique data patterns of files of data being ingested for indexing and construct correspondingly unique ingestion pattern models, or pattern models. Fields of the pattern models are mapped to slots of a dynamic slot index on a model-specific basis. Across all such pattern models, unique fields of the data (when present within a data pattern being mapped) may be mapped to corresponding, unique slots of the dynamic slot index. In this way, it is possible to transform files containing fields and associated field values into transformed files, in which slots of the slot index are mapped to corresponding field values.

Accordingly, it is possible to search the transformed files in a fast and efficient manner, using a dynamic slot index to transform received queries and then identify queried slots (and associated values) within the transformed files. Once queried slots are identified, the appropriate pattern models may be used with the dynamic slot index to provide desired files that include the searched-for values to requesting users, for example, by identifying the corresponding, original files, or by transforming the transformed files back into the original files.

In some implementations, a multi-layer recursive cache and associated caching techniques may be used to enhance a speed of the above-described operations, and related operations. For example, a local cache may be used for the pattern models, dynamic slot index portions, and associated transformed files that are most recently and/or most frequently used, a central cache may be used for less-frequently used pattern models, dynamic slot index portions, and associated transformed files, and long-term storage may be used for the least frequently-used pattern models, dynamic slot index portions, and associated transformed files (as well as for data recovery when needed).

FIG. 1 is a block diagram of a system for index generation and use for indeterminate ingestion patterns. In the example of FIG. 1, a search engine 102 receives, from a file source 104, a plurality of files represented by files 106, 108, 110. As referenced above and described in detail, below, the search engine 102 dynamically ingests and indexes the files 106, 108, 110, even when the files 106, 108, 110 have indeterminate ingestion patterns. Then, when a query is received from a query source 112, the search engine 102 may quickly and efficiently identify and return desired ones of the files 106, 108, 110, or portions thereof.

The search engine 102 may be implemented as a cloud-based or Software as a Service (SaaS)-based product that provides desired indexing and search functionality for a plurality of customers or clients. Thus, the file source 104, although illustrated singularly in FIG. 1 for ease of explanation, may represent many different sources of data from many different entities (e.g., tenants).

For example, as referenced above, a single business or other entity may own or manage a technology landscape that includes many different IT components or assets across many different geographic locations. For example, a business may deploy many different servers, routers, and databases, e.g., to provide web pages and corresponding functionalities for implementing primary business goals. Such business goals may range across many different industries, such as ecommerce, finance (e.g., banking), network security, government, energy, telecommunications, education, or healthcare.

Accordingly, the various files 106, 108, 110 may include data, such as log data, corresponding to any related technical or business data. For example, the files 106, 108, 110 are illustrated as including various fields and corresponding values. Thus, the file 106 may have a Field 1 of "IP Address" with a corresponding Value 1 (i.e., a specific IP address) and a Field 2 of "Hostname" with a corresponding Value 2 (i.e., a specific Hostname). In other examples, however, the file 106 may have a Field 1 of "Customer Name" with a corresponding Value 1 that includes a name of a customer, and a Field 2 of "Location" with a corresponding Value 2 that includes a location of the customer.

The above examples are brief and simplified and included merely for explanation and illustration. In various implementations, any single file may include tens, hundreds, or more fields and corresponding values. As referenced, any file source represented by the file source 104 may generate instances of any of the file(s) 106, 108, 110 periodically or in response to some predetermined event.

Further, any single business or other entity may include multiple file sources. Moreover, the search engine 102 may ingest files from many different file sources, across many different businesses or entities, and at many different geographic locations. For example, the search engine 102 may ingest files in a multi-tenant environment in which multiple tenants desire search and analytics capabilities with respect to their individual data log sources.

In some implementations, the files 106, 108, 110 may be implemented as JavaScript Object Notation (JSON) files or other suitable data-interchange format. The files 106, 108, 110 may include, or be referred to as, for example, documents, messages, datasheets, forms, or other types of documents. File content may be included and characterized in any desired manner, such as the field/value context of FIG. 1. In other implementations, file content may be characterized as key/value pairs. Further, a field or key may have additional properties beyond included value(s), such as a type or format (e.g., string, integer, or date).

An ingestion manager 114 may be configured to intake and index the files 106, 108, 110, including creating, populating, and otherwise generating a dynamic slot index 116, as described herein. For example, the dynamic slot index 116 may include or represent an index in which data slots, or slots, may be associated with corresponding fields of the files 106, 108, 110, in a manner that is specific to individual, unique data patterns that are included in the files 106, 108, 110.

In this way, the slots may be associated by the ingestion manager 114 with values from the corresponding fields of the files 106, 108, 110. Individual slots of the dynamic slot index 116 may be reused dynamically to avoid unconstrained index growth, while also avoiding excessive growth in a number of required slots. Searching of the dynamic slot index 116 may be optimized with respect to identifying and returning requested slots to thereby obtain associated, desired values and associated files.

In contrast, in some conventional slot indexes, a field may be assigned to a slot, and the slot may be filled with a value of the assigned field. A total number of available slots may be designated for a particular implementation.

In some such conventional approaches, a separate index is created for each data pattern that is ingested. In this regard, as referenced above, the various files represented by the files 106, 108, 110 may include many different data patterns, which may also be referred to as ingestion patterns, ingestion data patterns, or patterns. Such data patterns include unique (within files being indexed) combinations. Data patterns may be defined with respect to particular combinations of fields within a file. Other factors may be included in defining data patterns, such as field types or formats (e.g., integer, string, or date).

For example, the file 106 may be considered to have a data pattern of "Field 1, Field 2." The files 108, 110 may both be considered to have a single data pattern of "Field 2, Field 3." As may be observed from the files 108, 110, multiple files may share a single data pattern, while at the same time including different field values (i.e., value 3, value 4 for the file 108, and value 5, value 6 for the file 110).

In many cases, a single file source may have a single data pattern, or a single set of unique data patterns. Unique data patterns may occur in each of for example, Apache logs, Windows event logs, Information Technology Service Management (ITSM) logs, Docker logs, Kubernetes logs, or custom service/application logs. In other cases, however, a single file source might have many different data patterns.

Thus, it is possible to create a separate slot index for each such data pattern. For example, a slot index may be created for the data pattern of the file 106 and a separate slot index may be created for the data pattern of the files 108, 110.

Problematically, however, such an approach may result in undesirable or uncontrolled growth of index, shard (partition), and field counts, particularly when replica shards are used for purposes of decreased latency and/or increased reliability. If slot indexes are provided using underlying data nodes grouped in clusters and if a number of shards per node is limited, then resulting solutions may require deployment of an excessive number of data nodes across multiple clusters. Use of data compute power of such data nodes may be inefficient, because the data nodes are deployed specifically to support the excess number of shards, and other capabilities of the data nodes may go unused. In other examples, data compute power of such data nodes may be insufficient for the desired indexing operations.

In other conventional approaches, a single slot index may be created for all data patterns encountered. Such approaches may eliminate the above-described issue of unbounded growth of indexes and shards, since only a single slot index is used for all data patterns. Such approaches, however, suffer from uncontrolled growth of the number of mapped fields in the single slot index being used.

For example, a particular configuration in such conventional approaches may limit a total number of unique slots and assigned fields to some preconfigured value. Setting this total number to an excessively high value may result in performance limitations, such as increases in ingestion or search latency, and increased memory and processing demands. In some such cases, the single slot index may become unusable, or may cause cluster instabilities.

Even when a number of data patterns being indexed is kept within the preconfigured limit, the resulting slot index uses memory in a highly inefficient manner. For example, the single slot index being constructed may have a total number of unique slots of n=1000. As these slots are uniquely mapped to fields in various data patterns, a new data pattern, e.g., with a new field to be mapped, may be required to include empty (but memory-consuming) slots for all non-included fields in the new data pattern.

For example, in the simplified example of FIG. 1, a single slot index constructed using conventional techniques would store the single data pattern of the file 106 as Data Pattern 1=(Slot 1=Field 1), (Slot 2=Field 2). Then, the data pattern of the files 108, 110 would be stored as Data Pattern 2=(Slot 1=[empty]), (Slot 2=Field 2), and (Slot 3=Field 3). In the simplified example, Slot 1 represents wasted memory space for the second data pattern of Data Pattern 2. In actual examples, however, such an approach may result in significant quantities of unused memory, undesirable consumption of available unique slots, and an increased need for additional slots to be assigned.

Although the above techniques, and similar techniques, may work sufficiently in certain scenarios and for certain purposes, such techniques are not optimized for resource usage, and may be entirely unsuitable or unworkable for larger scale (e.g., multi-tenant) environments. In contrast, as referenced above, the search engine 102 of FIG. 1 enables reuse of slots of the dynamic slot index 116 in a dynamic manner for different data types (e.g., fields) of data, without leading to unlimited index, shard, or field growth. As a result, described techniques provide methods for storing an indeterminately large number of data patterns within a predetermined, fixed number of slots. Consequently, described indexing techniques enable subsequent search techniques in which it is possible, for example, to search an index column having varying data types (e.g., fields) to find desired data types, values, and associated files (e.g., documents, messages, datasheets, forms, or other types of documents).

To facilitate and leverage the dynamic nature of the dynamic slot index 116, the ingestion manager 114 may uniquely associate each data pattern with a corresponding pattern model, which may be stored in the aggregate as pattern models 118. As described in detail, below, each such pattern model may thus include a unique set of fields, and a unique model identifier (ID).

The pattern models 118 enable the reuse of slots of the dynamic slot index 116 and also enable transformation of the files 106, 108, 110 (using the dynamic slot index 116) into corresponding, transformed files 120. As also described below, the transformed files 120 capture and store all of the information within the original files 106, 108, 110, but in a format that enables fast and efficient use of the dynamic slot index 116 and the pattern models 118 to retrieve desired information.

Therefore, a query handler 122, upon receipt of a query from the query source 112, may use the dynamic slot index 116, the pattern models 118, and the transformed files 120 to return desired query results to the query source 112. The query handler 122 may process queries from the query source 112 in a manner that is transparent to a user of the query source 112 with respect to operations of the dynamic slot index 116, the pattern models 118, and the transformed files 120.

For example, a query from the query source 112 may request all files that contain "Field 1=Value 1," e.g., all files with an IP address equal to a specific value. As just referenced, a user of the query source 112 may simply specify as search parameters "IP address" and a specific address without being required to know a corresponding slot(s) of the slot dynamic slot index 116.

They query handler 122 may then identify all corresponding transformed files of the transformed files 120, using the dynamic slot index 116 and the pattern models 118. From the identified, transformed files, the query handler 122 may return to the query source 112 the corresponding files (e.g., the file 106) for which "Field 1=Value 1."

In more detail, the ingestion manager 114 may include a pattern model generator 124. The pattern model generator 124 may intake a file (e.g., the file 106), and may be configured to use the combination of fields in the file being ingested (e.g., the file 106) to generate a corresponding, unique model. For example, as described below, the pattern model generator 124 may execute a hash function that uses the included fields of the file being ingested to generate a unique hash. The unique hash may serve the purpose of providing a unique model ID corresponding to the data pattern of the file being ingested. The resulting pattern model may thus include the unique set of fields of the data pattern, and the unique (e.g., hashed) ID.

A slot mapper 126 of the ingestion manager 114 may be configured to map fields of the resulting pattern model to slots of the dynamic slot index 116. In the example of FIG. 1, the slot mapper 126 includes a model comparator 128 that is configured to determine whether the pattern model generated by the pattern model generator 124 already exists within the pattern models 118.

Figure 3:
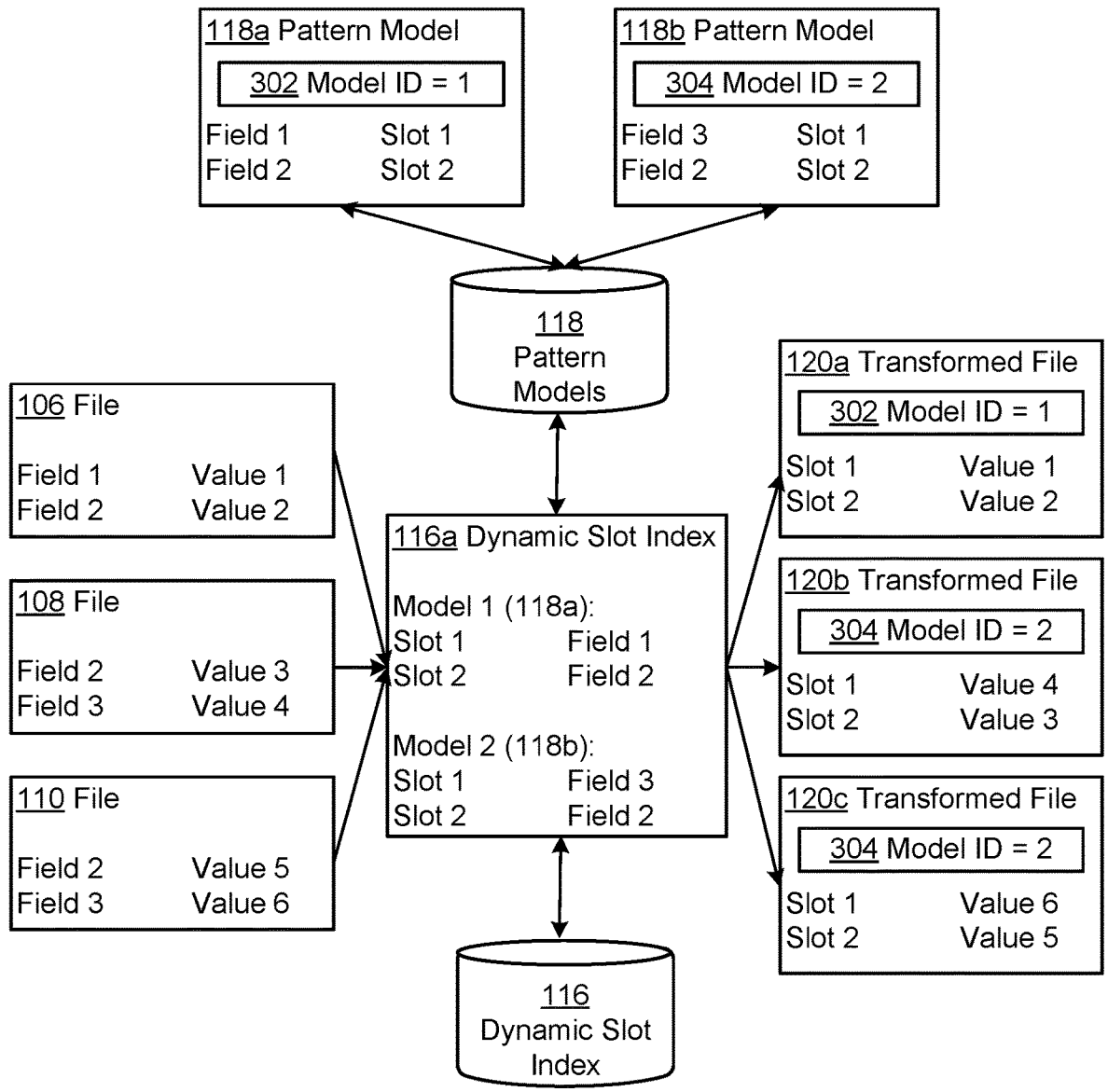
FIG. 3 is a diagram of an example implementation of the system of FIG. 1.

For example, in FIG. 1, the file 106 has its own unique pattern model, while the files 108, 110 would share a single, unique pattern model (as shown in more detail in FIG. 3). Therefore, when the file 106 is processed to generate a corresponding pattern model, the model comparator 128 may determine that no other such pattern model exists within the pattern models 118. Similarly, when the file 108 is processed to generate a corresponding pattern model, the model comparator 128 may determine that no other such pattern model exists within the pattern models 118. However, if the file 110 is subsequently processed, the slot comparator 128 may determine that the resulting pattern model already exists within the pattern models 118, having been created using the file 108. For example, when the pattern models 118 are created using a hash function, the model comparator 128 may identify identical data patterns (or distinguish non-identical data patterns) by hashing sets of fields of compared files and then comparing the resulting hash values.

If the model comparator 128 determines that the generated pattern model does not already exist, then a slot selector 130 of the slot mapper 126 may proceed to assign fields of the file being processed to slots of the dynamic slot index 116. For example, the slot selector 130 may assign Field 1 to a Slot 1 and Field 2 to a Slot 2, as illustrated below in FIG. 3. As described in detail, below, a conflict manager 132 may be configured to ensure that no conflicts exist between existing field/slot mappings and the slot selection of the slot selector 130 for the field(s) being processed.

Then, or if a pattern model for the ingested file already existed, a file transformer 134 may be configured to translate the ingested file for storage as a transformed file in the transformed files 120. For example, as shown below in FIG. 3, a transformed file (e.g., transformed file(s) 120a, 120b, 120c) that includes a corresponding model ID of a pattern model used in the transformation, as well as slots corresponding to fields within the dynamic slot index 116, provide necessary information required to relate values of the transformed files to corresponding fields of an original file.

For example, as referenced above, the query handler 122 may be configured to process a query from the query source 112, using the dynamic slot index 116, the pattern models 118, and the transformed files 120, to return a query response. For example, the query handler 122 may include a field inspector 136, which may be configured to determine included fields within a query from the query source 112. For example, for the above query of "Field 1=Value 1," the field inspector 136 may identify inclusion of Field 1 in the query.

A slot retriever 138 may then determine, from the dynamic slot index 116, a slot identified with each determined field. For example, the slot retriever 138 may determine that the Field 1 is mapped to Slot 1.

Then, a query modifier 140 may be configured to use the retrieved slots to modify the identified fields of the query with corresponding slots, to obtain a modified query. A file retriever 142 may be configured to match slots of the modified query with slots of the transformed files 120. For each transformed file, the file retriever may use a corresponding model ID of the transformed file to determine a corresponding pattern model of the pattern models 118. The file retriever 142 may thereby determine, for each transformed file, fields corresponding to specified slots of the transformed file. With this information, the file retriever 142 may provide query results to the query source 112.

In FIG. 1, the search engine 102 is illustrated as being implemented using at least one computing device 144, including at least one processor 146, and a non-transitory computer-readable storage medium 148. That is, the non-transitory computer-readable storage medium 148 may store instructions that, when executed by the at least one processor 146, cause the at least one computing device 144 to provide the functionalities of the search engine 102 and related functionalities.

For example, the at least one computing device 144 may represent one or more servers. For example, the at least one computing device 144 may be implemented as two or more servers in communications with one another over a network. Accordingly, the search engine 102 (or individual components, modules, or portions thereof) may be implemented using separate devices in communication with one another.

Figure 2:
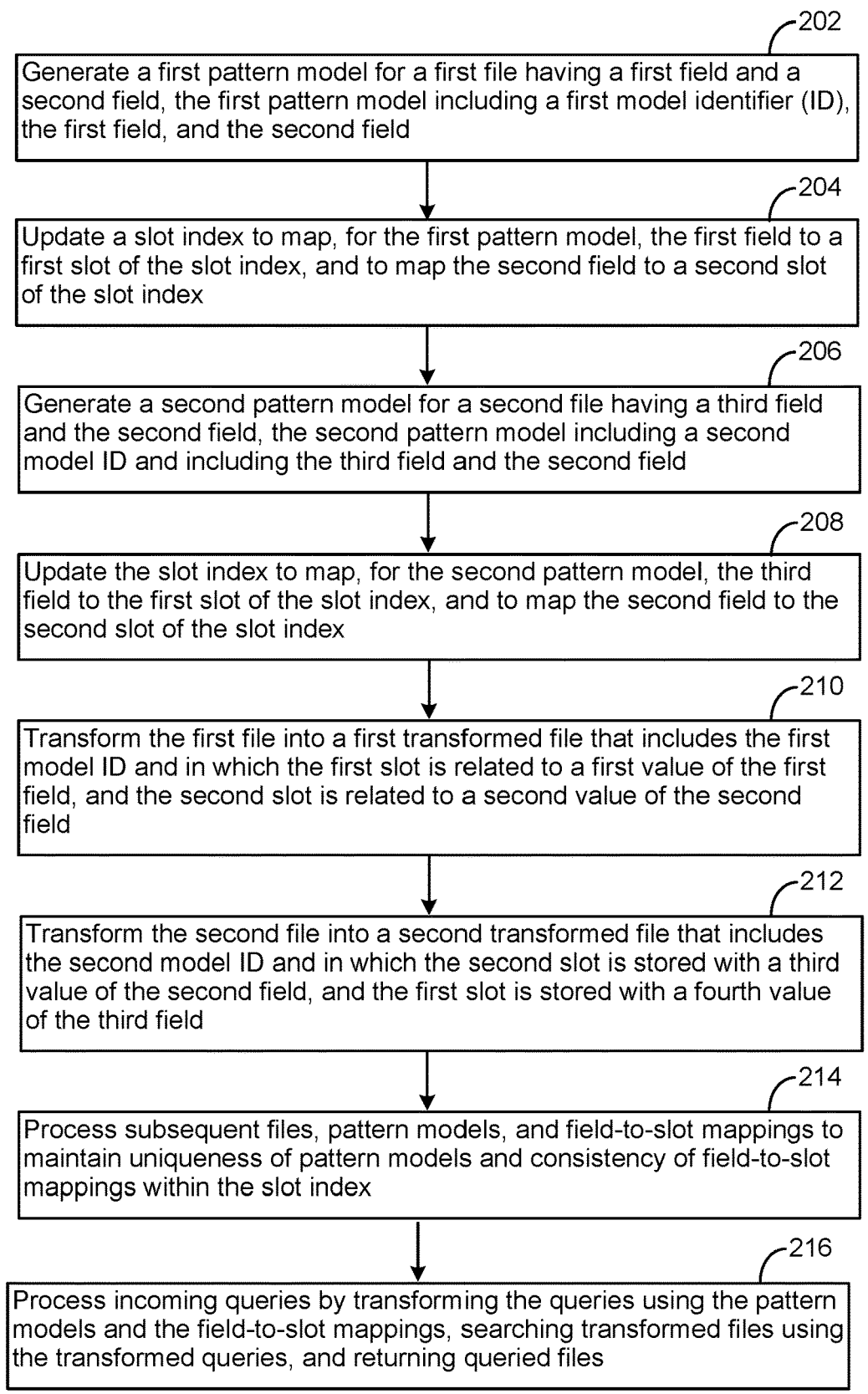
FIG. 2 is a flowchart illustrating example operations of the monitoring system of FIG. 1.

FIG. 2 is a flowchart illustrating example operations of the system of FIG. 1. In the example of FIG. 2, operations 202-216 are illustrated as separate, sequential operations. In various implementations, the operations 202-216 may include sub-operations, may be performed in a different order, may include alternative or additional operations, or may omit one or more operations. Further, in all such implementations, included operations may be performed in an iterative, looped, nested, or branched fashion (as illustrated, for example, in the flowcharts of FIGS. 6-8). For ease of explanation, FIG. 2 is described primarily with respect to the simplified example of FIG. 1, aspects of which are expanded in FIG. 3 and referenced below in the description of FIG. 2.

In FIG. 2, a first pattern model may be generated for a first file having a first field and a second field, the first pattern model including a first model identifier (ID), the first field, and the second field (202). For example, the pattern model generator 124 of the ingestion manager 114 may be configured to intake the file 106 and generate the pattern model 118a, as shown in FIG. 3. As shown, the pattern model 118a includes a model ID 302 (Model ID=1) and specifies inclusion of Field 1 and Field 2.

A slot index may be updated to map, for the first pattern model, the first field to a first slot of the slot index, and to map the second field to a second slot of the slot index (204). For example, the slot mapper 126 may update the dynamic slot index 116, as shown in 116a in FIG. 3, to specify that the pattern model 118a includes Field 1 mapped to Slot 1, and Field 2 mapped to Slot 2. In FIG. 3, the pattern model 118a is also illustrated as including the mapping of Field 1 to Slot 1 and Field 2 to Slot 2, but it will be appreciated that many different storage management techniques may be used.

A second pattern model may be generated for a second file having a third field and the second field, the second pattern model including a second model ID and including the third field and the second field (206). For example, the pattern model generator 124 of the ingestion manager 114 may be configured to intake the file 108 and generate the pattern model 118b, as shown in FIG. 3. As shown, the pattern model 118b includes a model ID 304 (Model ID=2) and specifies inclusion of Field 3 and Field 2.

The slot index may be updated to map, for the second pattern model, the third field to the first slot of the slot index, and to map the second field to the second slot of the slot index (208). For example, the slot mapper 126 may update the dynamic slot index 116, as shown in 116a in FIG. 3, to specify that the second pattern model 118b includes Field 3 mapped to Slot 1 and Field 2 mapped to Slot 2. Thus, as shown in FIG. 3 in 116a, the dynamic slot index 116 may include model-specific slot mappings in which an individual and otherwise unique slot of the dynamic slot index 116 may be re-used on a model-by-model basis. As referenced above and described in more detail below, this approach enables efficient use of available memory and slots allocated to the dynamic slot index 116 and avoids either using different indexes and associated mappings for each individual data pattern or avoids using a single index (with a single field-to-slot mapping) that includes all data patterns.

Further in FIG. 2, and with referenced to FIG. 3, the first file may be transformed into a first transformed file that includes the first model ID, and in which the first slot is related to a first value of the first field, and the second slot is related to a second value of the second field (210). For example, the file transformer 134 of FIG. 1 may transform the first file 106 into a first transformed file 120a of FIG. 3 that includes the model ID 302 and associates Slot 1 with Value 1 and Slot 2 with Value 2.

Similarly, the second file may be transformed into a second transformed file that includes the second model ID and in which the second slot is stored with a third value of the second field, and the first slot is stored with a fourth value of the third field (212). For example, the file transformer 134 of FIG. 1 may transform the second file 108 into a second transformed file 120b of FIG. 3 that includes the model ID 304 and associates Slot 1 with Value 4 and Slot 2 with Value 3.

Subsequent files, pattern models, and field-to-slot mappings may be processed to maintain the uniqueness of pattern models and the consistency of field-to-slot mappings within the slot index (214). For example, if the file 110 is received, then the model comparator 128 may be configured to determine that the file 110 corresponds to the existing pattern model 118b of FIG. 3. For example, when the pattern models are created using a hash function, the model comparator 128 may calculate a hash value using the fields of the file 110 and compare the resulting hash value to a similarly-calculated hash value of the pattern model 118b (where, as referenced herein, the hash value may correspond to the model ID 304, represented in FIG. 3 as Model ID=2).

On the other hand, if a new file with a new combination of fields were received, then the ingestion manager 114 may proceed to generate a new, corresponding pattern model and corresponding field-to-slot mappings. In all such instances, however, the slot mapper 126 may be configured to ensure that any unique field, once mapped to a slot in one pattern model, will be mapped to the same slot when present in a new pattern model being mapped. Thus, as already illustrated and described with respect to FIG. 3, Field 2 is mapped to Slot 2 in both the pattern models 118a, 118b. In contrast, the file 108 does not include Field 1, so the pattern model 118b is free to use a mapping of Field 3 to Slot 1.

Whether or not a new pattern model is required, incoming files may be transformed into transformed files. For example, the file 110 may be transformed into the transformed file 120c of FIG. 3.

As a result, and finally in FIG. 2, incoming queries may be processed by transforming the queries using the pattern models and the field-to-slot mappings, to thereby enable searching of the transformed files using the transformed queries and the subsequent return of queried files (216). For example, as described, the query handler 122 may be configured to modify a query with an included search field, e.g., specifying "Field 2=any value" into a transformed query of "Slot 2=any value," to thereby easily and quickly identify the transformed files 120b, 120c. As also described, the query results may be provided as original files 108, 110, so that a user submitting the relevant query is not required to have any knowledge of operations of the dynamic slot index 116 and related operations.

Figure 4:
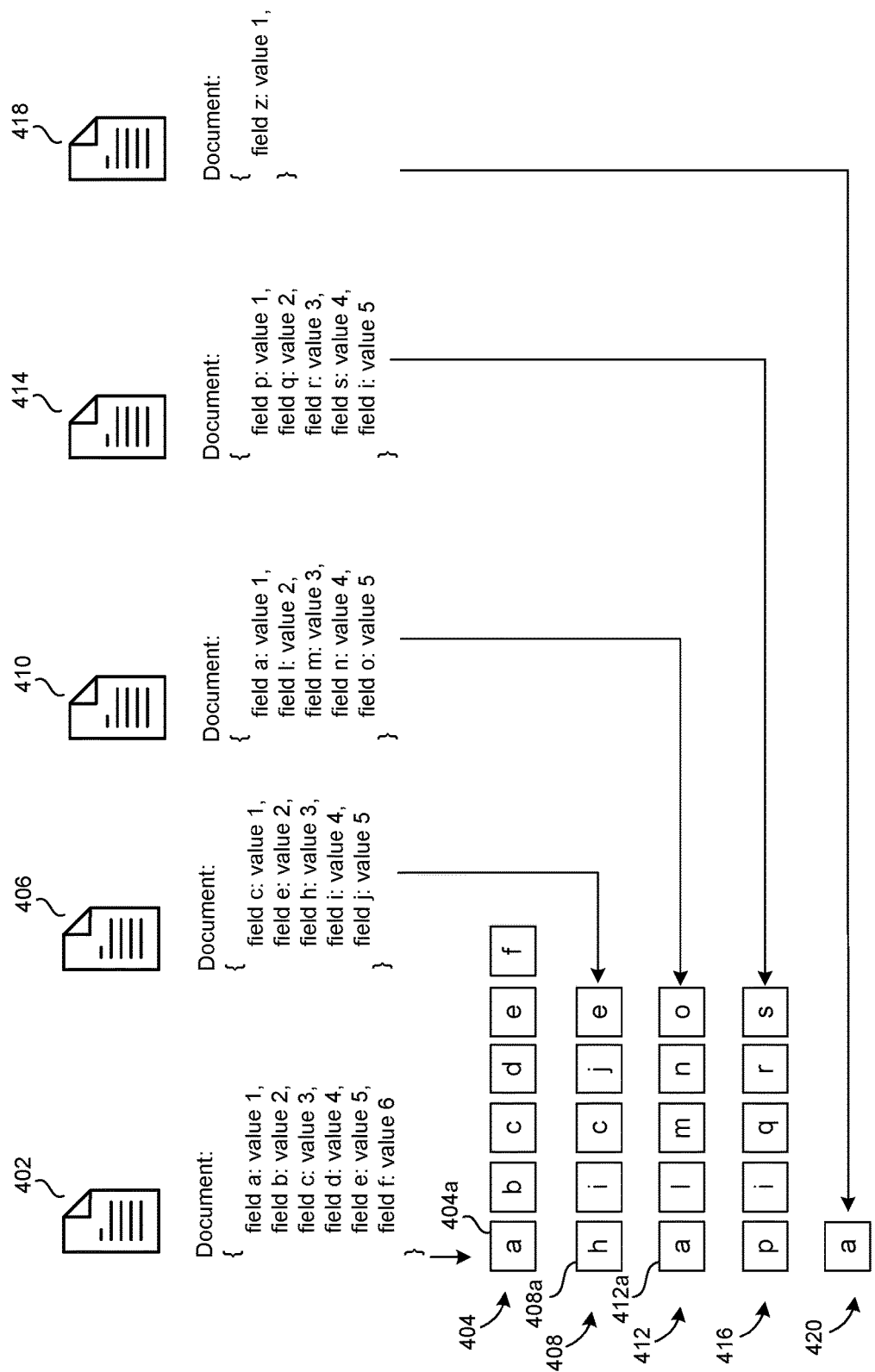
FIG. 4 is a more detailed example of index generation using the techniques of FIGS. 1-3.

FIG. 4 is a more detailed example of index generation using the techniques of FIGS. 1-3. In FIG. 4, a document 402 represents an example of the files 106, 108, 110 of FIG. 1. As shown, the document 402 includes a plurality of fields (field a, field b, field c, field d, field e, and field f) and respective values (value 1, value 2, value 3, value 4, value 5, and value 6).

Therefore, the document 402 may be used to generate a data pattern that may be represented as including "abcdef," and a corresponding model-specific, field-to-slot mapping 404. That is, each block (such as the block 404a) of the model-specific, field-to-slot mapping 404 represents a slot to which a field (e.g., the field "a") is mapped. Thus, in the model-specific, field-to-slot mapping 404, field "a" is mapped to slot 1 (404a), while field "b" is mapped to slot 2, field "c" is mapped to slot 3, field "d" is mapped to slot 4, field "e" is mapped to slot 5, and field "f" is mapped to slot 6.

Similar comments apply to a document 406 and corresponding model-specific, field-to-slot mapping 408, a document 410 and corresponding model-specific, field-to-slot mapping 412, a document 414 and corresponding model-specific, field-to-slot mapping 416, and a document 418 and corresponding model-specific, field-to-slot mapping 420. As may be observed, a length of the model-specific, field-to-slot mappings 404, 408, 412, 416, 420 may vary, based on a number of fields in each corresponding data pattern and corresponding pattern models. For example, the model-specific, field-to-slot mapping 404 includes 6 slots (blocks), while the model-specific, field-to-slot mapping 420 includes only a single slot (block).

In any given implementation, a maximum number of available slots may be set. For example, the maximum number of available slots may be chosen to correspond to or include a maximum number of fields anticipated in any single document, messages, datasheets, forms, or other types of documents. Within that maximum, any potential number and/or combination of fields may be included in a subsequent model-specific, field-to-slot mapping. Moreover, within such mappings, any number of values may be stored using the described framework and techniques. Further, if a maximum number of fields per document is increased, the corresponding maximum number of available slots may easily be increased, as well.

The example of FIG. 4 also illustrates that, as referenced above, a particular field-to-slot mapping may be uniquely maintained across all model-specific, field-to-slot mappings. For example, the field "a" is mapped to slot 1 in the first block 404a and is similarly mapped to slot 1 in the first block 412a of the model-specific, field-to-slot mapping 412, even though other fields are included in other blocks of the model-specific, field-to-slot mappings 404, 412. On the other hand, the field "h" is included in slot 1 in the first block 408a of the model-specific, field-to-slot mapping 408, because the field "a" is not included in the document 406. Put another way, slot 1 (or any slot) may be reused on a model-specific basis when the field that is first mapped to the slot 1 is not present in a subsequent data pattern and associated pattern model.

Figure 5:
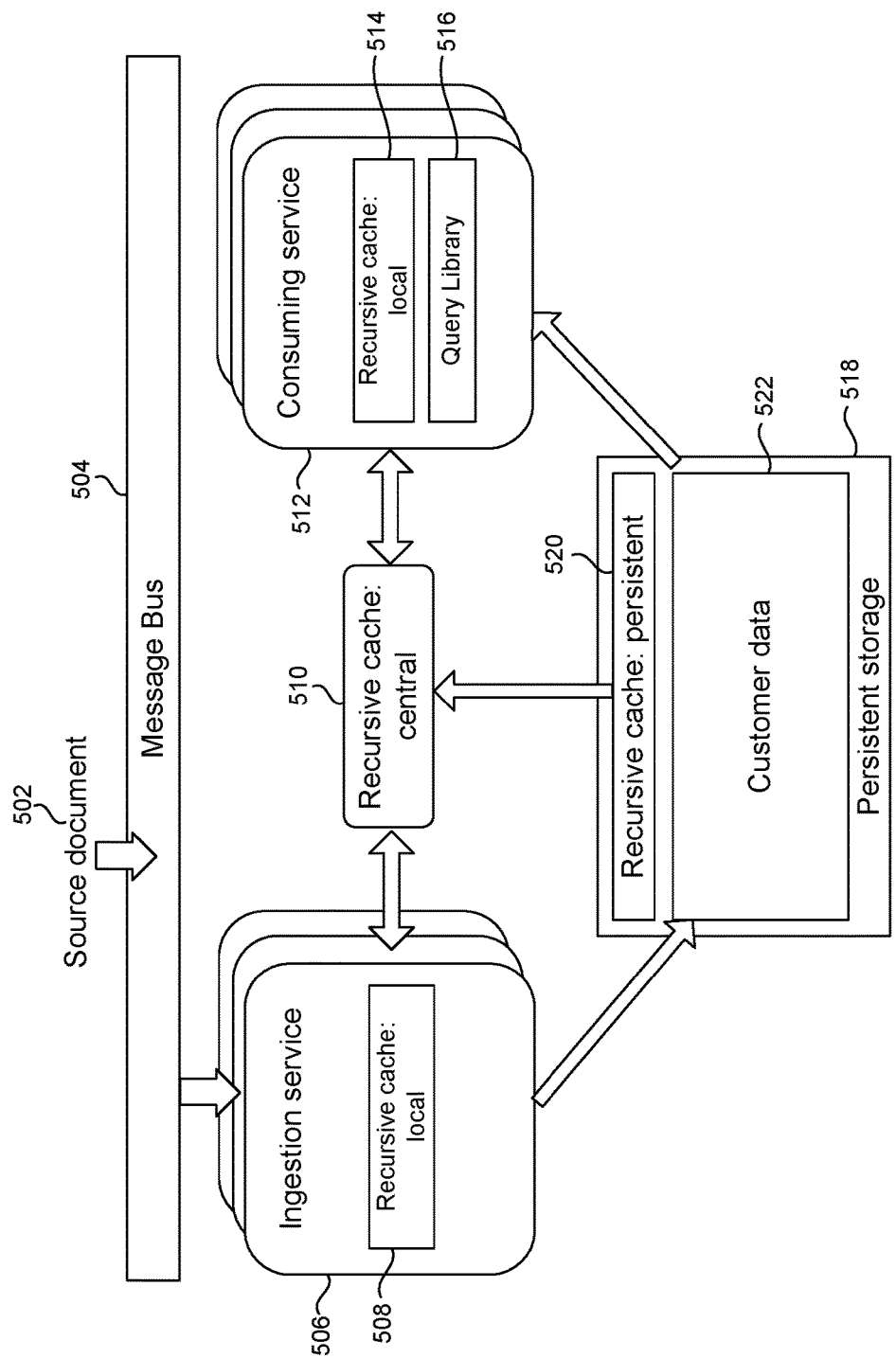
FIG. 5 is a block diagram illustrating a more detailed example of the system of FIG. 1.

FIG. 5 is a block diagram illustrating a more detailed example of the system of FIG. 1, using a publish/subscribe (pub/sub) architecture. Example operations of the system of FIG. 5 are provided below with respect to the flowcharts of FIGS. 6-8.

In FIG. 5, a source document 502 represents an example of the types of files 106, 108, 110, referenced above. A message bus 504 receives the source document 502. The message bus 504 provides a durable intermediate storage location from which ingestion service(s) 506 may retrieve submitted documents, such as the document 502. The ingestion service 506 provides an example implementation of the ingestion manager 114 of FIG. 1. Accordingly, the ingestion service 506 may be configured to retrieve document(s) 502 from the message bus 504, generate pattern models of the documents 502, and transform a storage format of the documents 502 for persistence as transformed documents, which demonstrate example implementations of transformed files 120 of FIG. 1. A consuming service(s) 512 may be enabled to perform desired queries against the document 502.

Further in FIGS. 5-8, and as referenced above, a multi-layer recursive cache is maintained for performance. A recursive local cache 508 may be stored and accessible at the ingestion service 506, and, similarly, a recursive local cache 514 may be stored and accessible at the consuming service 512. A recursive central cache 510 may be stored separately but may be accessible to the ingestion service 506 and the consuming service 512. A persistent recursive cache 520 may be stored separately and accessible to all of the ingestion service 506, consuming service 512, and central cache 510.

Thus, the multi-layer recursive caches 508, 510, 514, 520 may represent various types of in-memory and/or persistent storage used to store data corresponding to data of the system of FIG. 1, including the dynamic slot index 116, the pattern models 118, and the transformed files 120. Such data may be stored at each layer redundantly to layer(s) as explained below. For example, data that is most-frequently or most-recently accessed may be stored using the recursive local caches 508, 514, while less-frequently or less-recently used data is stored using the recursive central cache 510. Recursive persistent cache 520 may represent a cache tier or layer storing a full set of field-to-slot mappings and other related information from the dynamic slot index 116 and the pattern models 118 of FIG. 1, while persistent storage 518 may represent long-term, non-volatile storage for storing customer data 522. For example, the customer data 522 may be stored in the storage format corresponding to the transformed files 120 of FIG. 1.

The cache tier or layer of the recursive local caches 508, 514 may be implemented as in-memory constructs. The tier or layer of the central recursive cache 510 may be implemented as a distributed in-memory construct. The recursive local caches 508, 514 and the recursive central cache 510 may be implemented as non-persisted, volatile data sources. As described in detail below, data stored in the recursive local caches 508, 514 and the recursive central cache 510 may be aged out and removed after a defined period of not being used or may be emptied in the case of a system restart.

The recursive local caches 508, 514 and the recursive central cache 510 may be updated upon a system start or restart, and over time as new documents and new queries are received, using the recursive persistent cache 520 and the persistent storage 518. For example, once warmed up and populated, the recursive central cache 510 may mirror content of the recursive persistent cache 520, while providing direct, in-memory access to stored data (e.g., field-to-slot mappings). As the recursive central cache 510 is volatile and may not completely mirror the recursive persistent cache 520 at a given point in time, the recursive central cache 510 may be configured, for example, to automatically refresh any missing fields or other data during periodic retrievals from the recursive persistent cache 520.

In example implementations, the recursive central cache 510 may be implemented using a Remote Dictionary Server (Redis) data store or similar data store. In example implementations, the persistent storage 518 may be implemented using ElasticSearch or similar non-relational data store.

The consuming service 512 may thus be configured to implement a query library 516, which may be configured to query the customer data 522 using and referencing an original form and format of the customer data 522 (e.g., of the source document 502). As described above with respect to the query handler 122 of FIG. 1, the query library 516 may be configured to transform received queries using available model-specific field-to-slot mappings, submit the transformed queries, receive query results, and transform the query results for return in the source format.

Figure 6:
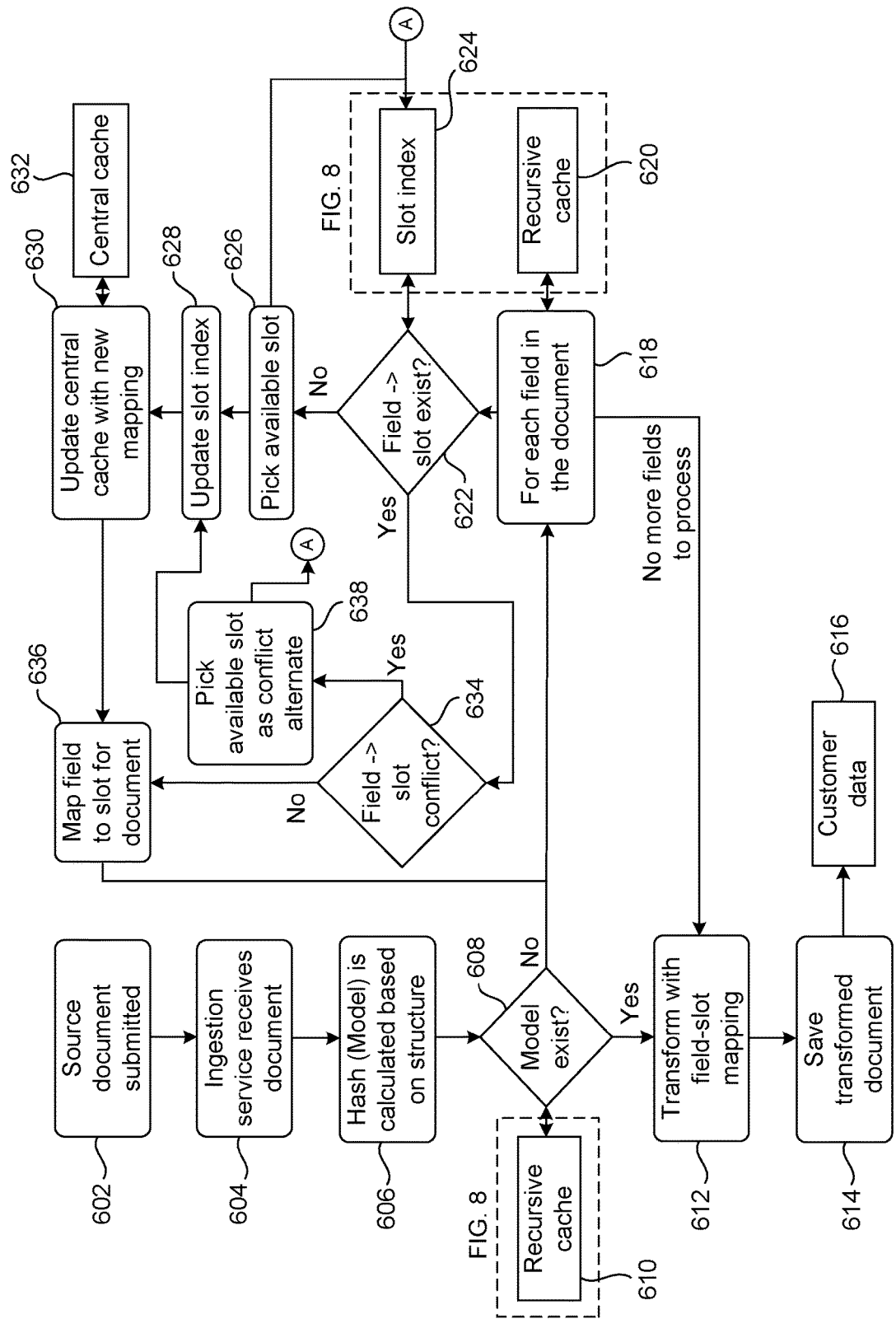
FIG. 6 is a flowchart illustrating an example of dynamic mapping of a slot index in the system of FIG. 5.

FIG. 6 is a flowchart illustrating an example of dynamic mapping of a slot index in the system of FIG. 5. In the example of FIG. 6, and with reference to FIG. 5 as well, source document 502 is submitted to message bus 504 for storage and processing. In example implementations, the document may include a JSON document that includes a set of field-value key pairs.

Then, in the pub-sub pattern architecture of FIG. 5, which provides a framework for message exchange, the ingestion service 506 receives the document 502 for processing (604). A hash function may be used to input the set of fields in the document 502, and a hash value representing a unique model ID is thus calculated based on the structure of the document 502 (606).

If the resulting model exists in that it has already been generated from a preceding document having the same set of fields (608), then the model may be retrieved (610) using the recursive cache, as referenced above, and described in more detail below with respect to FIG. 8.

Once retrieved, the relevant pattern model may be used to transform the received document using the model-specific, field-to-slot mapping of the pattern model (612). The transformed document may then be saved (614) as the customer data 522 (616). For example, a field's original name, type, and value may be included as part of the transformation.

If the model does not yet exist (608), then for each field in the document (618) determined from the recursive cache (620), it may be determined from the dynamic slot index (624) whether the field has already been mapped to a slot (622). That is, as described above with respect to the example implementations of FIGS. 1-4, an individual field, if present within a pattern model and underlying document(s), must be mapped to the same slot of the dynamic slot index 116, even in the context of a new mapping being conducted for a new pattern model.

If the mapping does not yet exist (622), then an available slot may be picked (626). For example, a slot may be picked at random from among available slots of the slot index (624), so as to avoid overloading any particular slot. In other examples, for similar reasons, a least-recently or least-frequently used slot may be selected.

The slot index (624) may be updated (628) and the central cache (632) may be updated with the new mapping (630). Accordingly, the new model-specific field-to-slot mapping may be made available to all distributed ingestion services 506, which reduces or eliminates a need to repeatedly compute field-to-slot mappings. The document may then be updated (636).

Also, in FIG. 6, if the field-to-slot mapping already exists, a conflict check for the field-to-slot mapping may be conducted (634). If no conflict exists, the process may proceed as just described (636). Otherwise, an updated available slot may be selected as a conflict alternate (638), and the slot index (624) may be updated as described previously. Then, the process may proceed as already described (628).

Once all fields have been processed in the customer data (618), the process may proceed as described with saving of the customer document transformed to the described alternate storage format in customer data (612, 614, 616).

Figure 7:
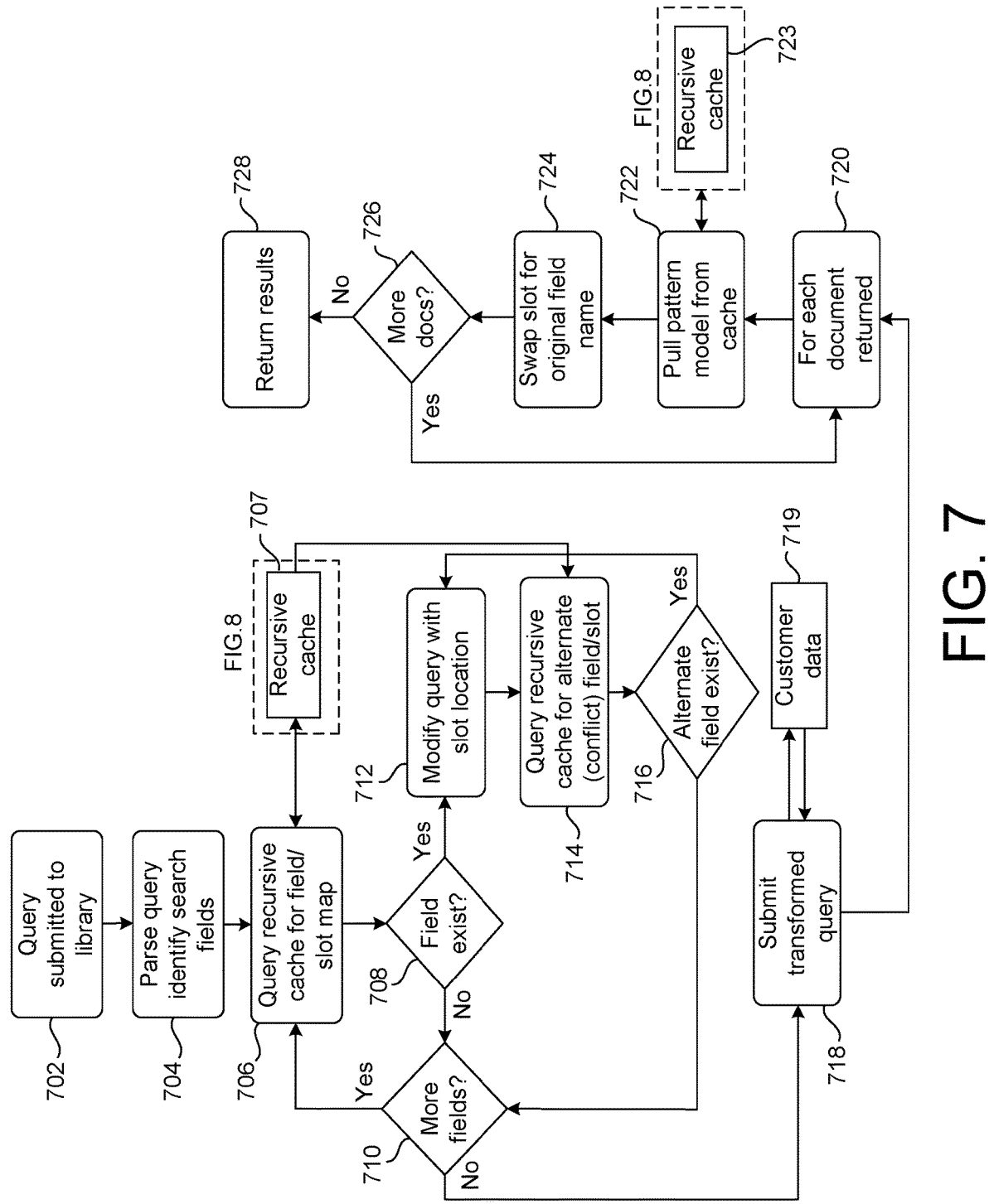
FIG. 7 is a flowchart illustrating an example of query handling in the system of FIG. 5.

FIG. 7 is a flowchart illustrating an example of query handling in the system of FIG. 5. In FIG. 7, the consuming service 512 submits a query to the query library 516 (702), using original field names corresponding to original source documents, such as the document 502.

The query is parsed to identify search fields for further processing (704). For each identified field, the recursive cache (707) may be queried to obtain the field's corresponding slot (706).

If a mapping for the field does not exist (708), then if there are more fields to be queried (710), field querying and identification may continue (706). In determining if a field exists (708), if there are no fields corresponding to the query (710), then notwithstanding its lack of inclusion in the field-to-slot mapping, the query may be submitted (718) directly to be applied against the customer data (719), in case the received field may be identified. If, however, there are more fields to process (710), then processing may continue (706).

Otherwise, if the field does exist (708), the process proceeds with updating or modifying the query by replacing the field with a corresponding slot mapping and slot location (712) and including an additional search clause limiting returned documents based on the field name. An alternate slot corresponding to a resolved conflict may also be queried (714) against the recursive cache (707) in case of a conflict as described above in FIG. 6 (634, 638). For example, the recursive cache may be queried for corresponding slots of conflicting fields.

If an alternate field exists (716), then a corresponding modification of the query may be implemented (712). Otherwise, and if there are no more fields (710), the transformed query may be submitted (718) to the customer data (719).

Then, for each document returned (720), a corresponding pattern model may be retrieved (722) from the recursive cache (723), using the model ID. That is, each document returned in the query result includes the model ID used to map and transform the original document. Using the pattern model data, a reverse transformation of the document may be performed to ensure that the document returned in the query results will match the original document.

Accordingly, the pattern model may be used to transform the document to its original input form by replacing each slot with the original field name, type, and value (724). If documents remain to be processed (726), the above-described operations may continue (720-726) until there are no more documents to process, at which point, the results may be returned (728).

Figure 8:
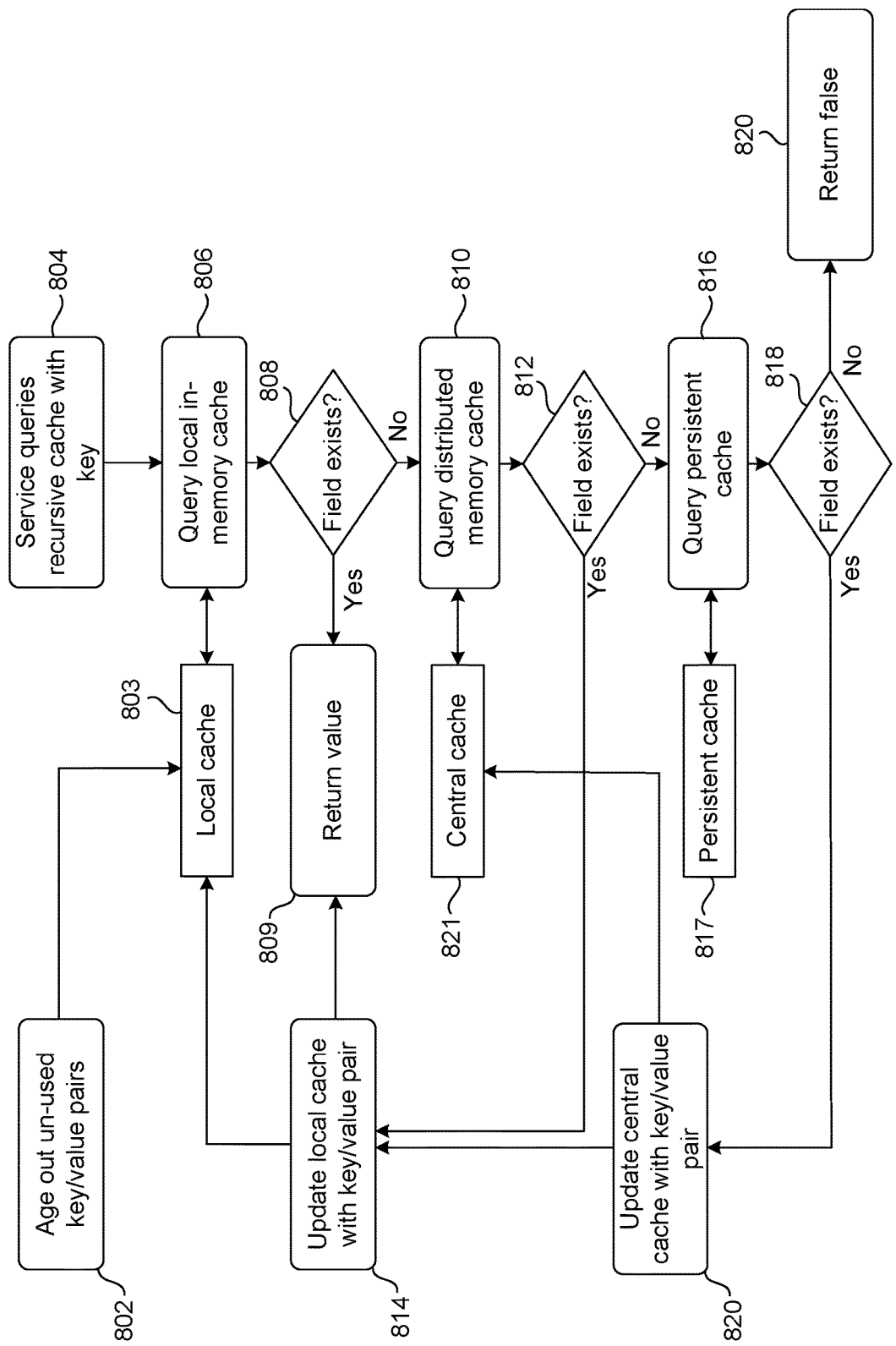
FIG. 8 is a flowchart illustrating an example of recursive caching techniques in the system of FIG. 5.

FIG. 8 is a flowchart illustrating an example of recursive caching techniques in the system of FIG. 5, as referenced with respect to FIGS. 6 and 7. In FIG. 8, an internal periodic timer is applied to the local in-memory cache (803) to age out the least recently used key/value pairs (802), e.g., as the size of the local cache approaches its configured maximum size.

When a service (e.g., ingestion service 506, or consuming service 512) queries the recursive cache with a key for a value (804), then the local in-memory cache (803, e.g., local cache 508 or 514 in FIG. 5) may be checked for a corresponding field/value pair (806). If the field exists locally (808), then the requested value may be returned (809) and the process may end.

If the field does not exist locally (808), then a query of the central in-memory cache (821, e.g., central cache 510 of FIG. 5) for the field/value pair may be executed (810). If the field exists in the central cache (812), then the local cache (803) may be updated. Accordingly, as described above, the field in question will be available for retrieval from the local cache during a subsequent iteration of the process of FIG. 8 (until aged out (802)). This process ensures that values that are frequently and recently used anywhere in the system of FIG. 5 are available using the local caches.

If the field does not exist (812) in the central cache (821), then the persistent cache (817) may be queried (816). If the field does not exist in the central cache (818), then a return of false may be generated (820). If the field exists in the persistent cache (817), then the local cache (803) may be updated, and the central cache (821) may be updated as well. Accordingly, again, as described above, the field in question will be available for retrieval from the local and the central cache during a subsequent iteration of the process of FIG. 8 (until aged out (802)).

Described techniques thus provide methods for allowing unlimited data patterns to be stored in a non-relational, slot index system, without requiring a high number of indexes, or indexes with excessively high field counts. Described techniques enable the storing and accessing of a very large cache via a recursive/persistent model, without requiring all data to be stored in-memory, while still providing in-memory performance. The resulting dynamic cache allows reuse of slots for different types of data so that it is possible to search index columns of varying data types.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   generate a first pattern model for a first file having a first field and a second field, the first pattern model including a first model identifier (ID), the first field, and the second field;
   store the first pattern model in at least one memory;
   update a slot index stored in the at least one memory to map, for the first pattern model, the first field to a first slot of the slot index, and to map the second field to a second slot of the slot index;
   generate a second pattern model for a second file having a third field and the second field, the second pattern model including a second model ID and including the third field and the second field;
   store the second pattern model in the at least one memory; and
   update the slot index to map, for the second pattern model, the third field to the first slot of the slot index, and to map the second field to the second slot of the slot index.

2. The computer program product of claim 1, wherein the instructions are further configured to cause the at least one computing device to:
   transform the first file into a first transformed file that includes the first model ID and in which the first slot is related to a first value of the first field, and the second slot is related to a second value of the second field.

3. The computer program product of claim 2, wherein the instructions are further configured to cause the at least one computing device to:
   transform the second file into a second transformed file that includes the second model ID and in which the second slot is stored with a third value of the second field, and the first slot is stored with a fourth value of the third field.

4. The computer program product of claim 3, wherein the instructions are further configured to cause the at least one computing device to:
   receive a query containing a search field;
   transform the query to a transformed query, including mapping the search field to a corresponding slot of the slot index;
   search a plurality of transformed files, including the first transformed file and the second transformed file;
   identify at least one transformed file that includes the corresponding slot, with at least one corresponding value; and return at least one file corresponding to the at least one transformed file, including the search field and the at least one corresponding value.

5. The computer program product of claim 3, wherein the instructions are further configured to cause the at least one computing device to:
store the slot index, the first pattern model, the second pattern model, the first transformed file, and the second transformed file as data in a multi-layer recursive cache that includes a local cache storing most recently or most frequently used data, a central cache storing less recently or less frequently used data, and persistent storage storing all included data.

6. The computer program product of claim 1, wherein the instructions are further configured to cause the at least one computing device to:
determine that a third file corresponds to the second pattern model; and
transform the third file into a third transformed file that includes the second model ID and in which the second slot is stored with a fifth value of the third field, and the first slot is stored with a sixth value of the third field.

7. The computer program product of claim 1, wherein the instructions are further configured to cause the at least one computing device to:
generate the first pattern model by hashing the first field and the second field to obtain the first model ID.

8. The computer program product of claim 1, wherein the instructions are further configured to cause the at least one computing device to:
receive a third file and determine that the third file does not correspond to the first pattern model or the second pattern model;
select a field in the third file;
determine whether the selected field is mapped to a corresponding slot of the slot index, and if so, map the selected field to the corresponding slot, and if not, select a new slot of the slot index; and
map the selected field to the new slot.

9. The computer program product of claim 8, wherein the instructions are further configured to cause the at least one computing device to:
determine that the third file does not correspond to the first pattern model or the second pattern model by hashing contents of the third file and comparing a resulting hash value to the first model ID of the first pattern model and to the second model ID of the second pattern model.

10. The computer program product of claim 8, wherein the instructions are further configured to cause the at least one computing device to:
select the new slot of the slot index by randomly selecting a currently-unused slot that does not conflict with existing slot mappings of the slot index.

11. A computer-implemented method, the method comprising:
generating a first pattern model for a first file having a first field and a second field, the first pattern model including a first model identifier (ID), the first field, and the second field;
storing the first pattern model in at least one memory;
updating a slot index stored in the at least one memory to map, for the first pattern model, the first field to a first slot of the slot index, and to map the second field to a second slot of the slot index;
generating a second pattern model for a second file having a third field and the second field, the second pattern model including a second model ID and including the third field and the second field; and
storing the second pattern model in the at least one memory;
updating the slot index to map, for the second pattern model, the third field to the first slot of the slot index, and to map the second field to the second slot of the slot index.

12. The method of claim 11, further comprising:
transforming the first file into a first transformed file that includes the first model ID and in which the first slot is related to a first value of the first field, and the second slot is related to a second value of the second field.

13. The method of claim 12, further comprising:
transforming the second file into a second transformed file that includes the second model ID and in which the second slot is stored with a third value of the second field, and the first slot is stored with a fourth value of the third field.

14. The method of claim 13, further comprising:
receiving a query containing a search field;
transforming the query to a transformed query, including mapping the search field to a corresponding slot of the slot index;
searching a plurality of transformed files, including the first transformed file and the second transformed file;
identifying at least one transformed file that includes the corresponding slot, with at least one corresponding value; and
returning at least one file corresponding to the at least one transformed file, including the search field and the at least one corresponding value.

15. The method of claim 13, further comprising:
storing the slot index, the first pattern model, the second pattern model, the first transformed file, and the second transformed file as data in a multi-layer recursive cache that includes a local cache storing most recently or most frequently used data, a central cache storing less recently or less frequently used data, and persistent storage storing all included data.

16. The method of claim 11, further comprising:
determining that a third file corresponds to the second pattern model; and
transforming the third file into a third transformed file that includes the second model ID and in which the second slot is stored with a fifth value of the third field, and the first slot is stored with a sixth value of the third field.

17. The method of claim 11, further comprising:
receiving a third file and determine that the third file does not correspond to the first pattern model or the second pattern model;
selecting a field in the third file;
determining whether the selected field is mapped to a corresponding slot of the slot index, and if so, map the selected field to the corresponding slot, and if not, select a new slot of the slot index; and
mapping the selected field to the new slot.

18. A system comprising:
at least one memory including instructions; and
at least one processor that is operably coupled to the at least one memory and that is arranged and configured to execute instructions that, when executed, cause the at least one processor to
generate a first pattern model for a first file having a first field and a second field, the first pattern model including a first model identifier (ID), the first field, and the second field;

store the first pattern model in at least one memory;
update a slot index stored in the at least one memory to map, for the first pattern model, the first field to a first slot of the slot index, and to map the second field to a second slot of the slot index;
generate a second pattern model for a second file having a third field and the second field, the second pattern model including a second model ID and including the third field and the second field; and
storing the second pattern model in the at least one memory;
update the slot index to map, for the second pattern model, the third field to the first slot of the slot index, and to map the second field to the second slot of the slot index.

19. The system of claim 18, wherein the instructions, when executed, are further configured to cause the at least one processor to:
transform the first file into a first transformed file that includes the first model ID and in which the first slot is related to a first value of the first field, and the second slot is related to a second value of the second field; and
transform the second file into a second transformed file that includes the second model ID and in which the second slot is stored with a third value of the second field, and the first slot is stored with a fourth value of the third field.

20. The system of claim 19, wherein the instructions, when executed, are further configured to cause the at least one processor to:
receive a query containing a search field;
transform the query to a transformed query, including mapping the search field to a corresponding slot of the slot index;
search a plurality of transformed files, including the first transformed file and the second transformed file;
identify at least one transformed file that includes the corresponding slot, with at least one corresponding value; and
return at least one file corresponding to the at least one transformed file, including the search field and the at least one corresponding value.

* * * * *